(12) United States Patent
Williams

(10) Patent No.: US 7,009,720 B1
(45) Date of Patent: Mar. 7, 2006

(54) APPARATUS FOR OVERCOMING SHEET FEEDING JAMS IN AN IMAGING SYSTEM

(76) Inventor: Frank J. Williams, 2711 Saint Albans Dr., Rossmoor, CA (US) 90720

( * ) Notice: Subject to any disclaimer, the term of this patent is extended or adjusted under 35 U.S.C. 154(b) by 552 days.

(21) Appl. No.: 09/638,445

(22) Filed: Aug. 14, 2000

Related U.S. Application Data

(60) Provisional application No. 60/175,139, filed on Jan. 7, 2000, provisional application No. 60/173,181, filed on Dec. 27, 1999, provisional application No. 60/172,028, filed on Dec. 23, 1999, provisional application No. 60/170,272, filed on Dec. 11, 1999, provisional application No. 60/148,668, filed on Aug. 13, 1999.

(51) Int. Cl.
*G06F 13/00* (2006.01)
*G06F 3/12* (2006.01)

(52) U.S. Cl. ..................... 358/1.12; 355/407

(58) Field of Classification Search ............... 358/1.12, 358/1.13, 1.14, 1.16, 1.17, 1.6, 505, 402, 358/403, 437; 355/407, 408; 271/3.06, 271/3.09, 3.15, 3.17, 3.18, 4.01, 4.02, 9.02, 271/9.04, 97, 106
See application file for complete search history.

(56) References Cited

U.S. PATENT DOCUMENTS

| | | | |
|---|---|---|---|
| 4,182,568 A | 1/1980 | Levine | |
| 4,571,073 A | 2/1986 | Diedrich et al. | |
| 4,587,532 A | 5/1986 | Asano | |
| 5,165,062 A | 11/1992 | Ogura et al. | |
| 5,208,640 A | 5/1993 | Horie et al. | |
| 5,428,464 A | 6/1995 | Silverbrook | |
| 5,574,831 A | 11/1996 | Grenda | |
| 5,881,212 A | 3/1999 | Morita | |
| 5,967,048 A | 10/1999 | Fromson et al. | |
| 6,075,928 A | 6/2000 | Kitada | |

FOREIGN PATENT DOCUMENTS

JP 09030705 A * 2/1997

* cited by examiner

*Primary Examiner*—Douglas Q. Tran
(74) *Attorney, Agent, or Firm*—Gene Scott, Patent Law & Venture Group

(57) ABSTRACT

An image forming apparatus scans, stores, and forms images. The apparatus includes an optical scanning device adapted to produce optical images to be reproduced; and an image storing device, connected for receiving the optical images from the optical scanning device for temporary storage thereof. The apparatus also has a device for reproducing a corresponding image signal at a later time. A plurality of image formation devices are connected for receiving the image signal from the image storing device and are enabled for forming the image on sheets which move through the apparatus. The apparatus further includes a sheet feeding device, interconnected and adapted for selectively receiving sheets from a sheet storing device, delivering the sheets to at least one of the image forming devices for producing latent images of the optical images onto the sheets, and thereafter, delivering the sheets to a sheet receiving device. The apparatus further comprises a control system interconnected and adapted for selectively controlling the movement of the sheets from the sheet storage device, through the optical scanning device, to the sheet receiving device with selective alternative sheet movement depending upon sheet jams within the apparatus.

3 Claims, 2 Drawing Sheets

APPARATUS FOR OVERCOMING SHEET FEEDING JAMS IN AN IMAGING SYSTEM

This present application is related to five previously filed provisional patent applications having Ser. Nos. 60/148,668, 60/170,272, 60/172,028, 60/173,181 and 60/175,139 and assigned filing dates of Aug. 13, 1999, Dec. 11, 1999, Dec. 23, 1999, Dec. 27, 1999, and Jan. 7, 2000, which contains subject matter substantially the same as that described and claimed in the present application.

BACKGROUND OF THE INVENTION

1. Field of the Invention

This invention relates generally to photo-imaging systems, and more particularly to a device for making multiple copies simultaneously and for overcoming mechanical jams and other problems in current machinery.

2. Description of Related Art

The following art defines the present state of this field:

Levine, U.S. Pat. No. 4,182,568 describes a multiplexed electrostatic copier having plural separated scan stations for randomly receiving and scanning documents to be copied, and a common developing mechanism for electrostatically making copies of the scanned images, and identifying and delivering the copies to the proper user. Provision is made for simultaneous or sequential operation by the different scan stations and for on-line and off-line modes of operation to effectuate the multiplexing by the common developing mechanism.

Diedrich et al., U.S. Pat. No. 4,571,073 describes an apparatus for the exposure of photosensitive plates on two sides, in particular for the preparation of printed circuits for electronic devices, comprising two similar exposure devices, mechanically connected and arranged adjacent to each other, each being equipped under a copying frame with an illuminating system, wherein a glass plate filling the format is arranged in the copying frame onto which a negative or positive master may be placed, together with a photosensitive plate above it, with a reversing station being associated with each of the exposure devices and both between each exposure device and the reversing station associated with it, and between the reversing stations a pivoting arm rotatable by 180 degrees each being arranged. The light source of each exposure device is arranged in or under the associated reversing station, wherein the beam of light may be conducted to the plate to be exposed of each exposure station. The first exposure device may be connected by means of a plate transport mechanism controlled by the exposure device with a stacking carriage. The second exposure device may be connected with a plate transport mechanism controlled by the exposure device for the removal of the exposed plates from the exposure device and their further transportation.

Asano, U.S. Pat. No. 4,587,532 describes a recording apparatus including a plurality of printers each for reproducing an image on a recording sheet upon receiving the same signal, and a single sheet delivering device for delivering recording sheets to the printers. The present invention also provides a recording apparatus including a plurality of printers each for reproducing an image on a recording sheet upon receiving the same signal, and a sheet discharge device for feeding the recording sheets from the printers to a collector or sorter.

Ogura et al., U.S. Pat. No. 5,165,062 describes an automatic printing system including an array of printing devices arranged along a direction in which the printing member is fed, each of printing devices having a positioning mechanism for positioning the printing member, a feeding device for feeding a printing member to each printing device, a delivery device for picking up the printing member from the feeding device and bringing the printing member into engagement with the positioning mechanism, and a discharging device for discharging the printing member, which has been exposed by the printing device, from the printing device. The automatic printing system further includes a supplying device for storing printing members of different sizes and selectively supplying the printing members one at a time, a punching device for forming a positioning opening in the printing member supplied by the supplying device, and an automatic developing device for developing the printing member which has been exposed by the printing device.

Horie et al., U.S. Pat. No. 5,208,640 describes an image recording apparatus including a plurality of recording modules for substantially simultaneously recording on recording sheets images according to image data supplied thereto, an image data supplier for supplying images to the recording modules, a sheet supplier for supplying the recording sheets to the recording modules, and sheet distributors for distributing the recording sheets thus supplied successively by the sheet supplier to the recording modules.

Silverbrook, U.S. Pat. No. 5,428,464 describes a parallel printing system which is particularly useful for colour laser printing. The system includes a source of video image data generally derived from a scanner or a graphics system, and a plurality of print engines that, substantially simultaneously, print images output from the source. The printing system also includes a parallel printing desynchroniser that interfaces the source with each one of the print engines and permits asynchronous operation of each of the print engines by having various data stores, a first of which receives synchronous data from the source, and a plurality of other stores, corresponding to each engine, which receive data from the first store simultaneously, and output that data in synchronism with the respective print engine.

Grenda, U.S. Pat. No. 5,574,831 describes a printer system which allocates various pages of a job to a plurality of individual printers that each print a different page of the job. The system is therefore capable of increasing the speed of the job without requiring a faster engine speed. The printer system includes a plurality of print engines, a sequenced stacking device, imaging electronics to create raster image signals suitable for the video input of the print engines and control electronics to direct these electrical signals to each of the print engines on a page by page basis and to control the stacking device to direct printed sheets to the output stack in proper sequence. The stacking device loads the print images into a single properly sequenced output stack at a speed of n.times.i images per minute, wherein n is the number of print engines used and i is the speed of a single print engine in images per minute.

Morita, U.S. Pat. No. 5,881,212 describes a printing system including a faceup printer and a facedown printer, the faceup and facedown printers are paired to print one document. In this case, the document is printed by the faceup printer from the end to start of the document and by the facedown printer from the start to end thereof. Printing ends when one printer is to print a page being printed by the other printer. Therefore, even if the printing speeds of the two printers are different, the whole document can be printed most efficiently. Even for a system having a larger number of printers, printing can be efficiently performed by similarly pairing the printers.

Fromson et al., U.S. Pat. No. 5,967,048 describes a method and system for provisioning program controlled switches in a public switched telephone network using a Recent Change Memory Administration Center wherein verbal orders to a business office are translated to machine language, delivered to the Recent Change Memory Administration Center, and processed into a first category of orders susceptible of automatic processing and entry into the intended switch, and into a second category of orders requiring manual processing. The second category of orders which require manual processing are first automatically processed to overlay orders directed to the same switch and local link connected to that switch. Following such automated order overlaying, the overlayed orders are manually processed and entered into the intended switch. Provision is made to deliver the data resulting from the manual processing to further processing to compare that data to the data actually entered into the switch. If the data has been correctly entered into the switch, a verbal indication that the service has been installed is verbally delivered to the customer.

Kitada, U.S. Pat. No. 6,075,928 describes a multi-function image processing system smooth in operation and high in reliability having the functions of a fax and a printer. An image is printed by a print engine, data are transmitted and received by a host interface and processed by a print data processing section which produces print data. The print data are transmitted to the print engine through a printer engine interface. The connection with the public line is controlled by a channel controller. On the other hand, an original is converted into image data by a reader, which image data are processed and print data produced by a fax controller. The print data are transmitted to the print engine by a fax engine interface. The transmission and receiving of the print data and the control data are arbitrated by an engine interface arbiter between the print engine interface and the fax engine interface on one hand and the print engine on the other hand.

The prior art teaches recording apparatus with a plurality of printers each for reproducing an image on a recording sheet upon receiving an optical signal, a sheet delivery device for delivering recording sheets to the printers and a sheet discharge device for receiving the printed sheets. The prior art also teaches parallel printing onto sheets from electronic signals received. The prior art further teaches the use of parallel printers to copy different sheets of a multi-sheet document in order to complete the printing task in an accelerated manner. However, because these prior art machines are complex, by necessity, in order to achieve their respective objectives, they tend to have more maintenance and breakdown problems as compared with simpler machines. The prior art does not teach a means for improved performance and superior up-time. The present invention fulfills these needs and provides further related advantages as described in the following summary.

SUMMARY OF THE INVENTION

The present invention teaches certain benefits in construction and use which give rise to the objectives described below.

The present invention defines an image forming apparatus that scans, stores, and forms images. The apparatus includes an optical scanning device adapted to produce optical images to be reproduced; and an image storing device, connected for receiving the optical images from the optical scanning device for temporary storage thereof. The apparatus also has a device for reproducing a corresponding image signal at a later time. A plurality of image formation devices are connected for receiving the image signal from the image storing device and are enabled for forming the image on sheets which move through the apparatus. The apparatus further includes a sheet feeding device, interconnected and adapted for selectively receiving sheets from a sheet storing device, delivering the sheets to at least one of the image forming devices for producing latent images of the optical images onto the sheets, and thereafter, delivering the sheets to a sheet receiving device. The apparatus further comprises a control system interconnected and adapted for selectively controlling the movement of the sheets from the sheet storage device, through the optical scanning device, to the sheet receiving device with selective alternative sheet movement depending upon sheet jams within the apparatus.

A primary objective of the present invention is to provide an image reproducing apparatus having advantages not taught by the prior art.

Another objective is to provide such an apparatus capable of sensing sheet jams and clearing them as they occur so as to continue image reproducing operations.

A further objective is to provide such an apparatus capable of bypassing the site of a sheet jam, upon sensing it, with an alternative path.

A still further objective is to provide such an apparatus having such a redundant capacity as to enable a high reliability in operation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention, a high reliability imaging system.

Figure 1:
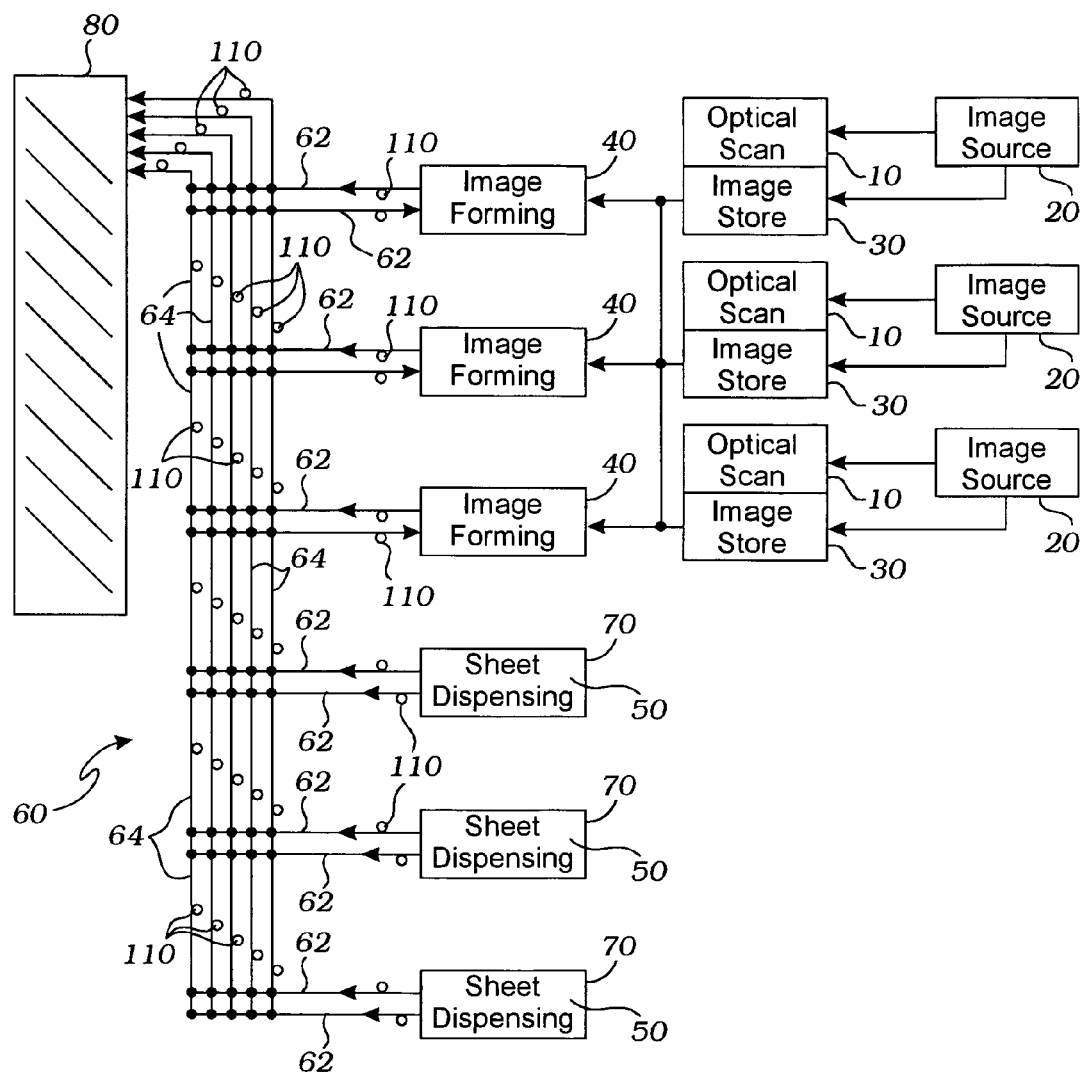
FIG. 1 is a schematic diagram of the present invention system.

As shown in FIG. 1 the system comprises an optical scanning means 10 adapted to produce optical images from an image source 20, an image storing means 30, connected to the scanning means 10 for receiving and storing the optical images, a plurality of image forming means 40, each connected for receiving the optical images from the image storing means 30 and enabled further for forming the images on recording sheets 50, a multi-path sheet feeding means 60, connected and adapted for selectively pulling sheets 50 from any one of a plurality of sheet dispensing means 70, delivering the sheets 50 to one or more of the plurality of image forming means 40, so as to enable the forming of latent images onto the sheets 50, and thereafter, delivering said sheets 50 with latent images to a sheet receiving means 80, and a controlling means 90 adapted for selectively choosing paths for the sheets 50 to move from the sheet dispensing means 50, through a selected one of the image forming means 40 to the sheet receiving means 80, the controlling means 90 adapted for sensing sheet jams, for activating jam clearance actions, and for selecting alternative sheet paths.

The invention further comprises a sheet jam sensor means 100 and a jammed sheet receiving means 110, the sheet feeding means 60 adapted for reversing sheet flow direction so as to move a jammed sheet 50 from the sheet feeding means 60 into the jammed sheet receiving means 110 so as to clear the path through the sheet feeding means 60.

The sheet jam sensor means 100 comprises a distributed array of a plurality of sensors 120, the plurality of sensors being positioned for sensing a leading edge of each one of the sheets 50 in turn as they move through the sheet feeding means 60 and enabled for transmitting a signal to the controlling means 90 upon sensing of each of the leading edges.

The principles of construction and operation of the instant apparatus are not altogether different from that of the current state of the art. Such is clearly taught in the references sited above. Of particular interest is Asano, U.S. Pat. No. 4,587,532 issued on May 6, 1986, and Horie et al, U.S. Pat. No. 5,208,640, issued on May 4, 1993, both of which are incorporated into the present application by reference to teach the construction and operation of the present apparatus with exceptions and improvements which are herein identified with enough detail for those of skill in the art to make such improvements.

Clearly, Asano and Horie et al teach the means by which one of skill may make and operate a photocopier machine of the modern type with parallel processing capability. Therefore, the optical scanning means 10 adapted to produce optical images from an image source 20, the image storing means 30, connected to the scanning means 10 for receiving and storing the optical images, the plurality of image forming means 40, each connected for receiving the optical images from the image storing means 30 and enabled further for forming the images on recording sheets 50, the multipath sheet feeding means 60, connected and adapted for selectively pulling sheets 50 from any one of a plurality of sheet dispensing means 70, and for delivering the sheets 50 to one or more of the plurality of image forming means 40, so as to enable the forming of latent images onto the sheets 50, and thereafter, delivering said sheets 50 with latent images to the sheet receiving means 80 are enabled in the present application by Asano's teaching. Further, the controlling means 90 which is adapted for selectively choosing paths for the sheets 50 to move from the sheet dispensing means 70, through a selected one of the image forming means 40 to the sheet receiving means 80, is clearly enabled through Asano as well, at least in principal, but not in the manner in which the present invention operates, which is novel. The controlling means 90 is adapted for sensing sheet jams, for activating jam clearance actions, and for selecting alternative sheet paths in a novel manner as well, which forms the basis of the present invention.

Figure 2:
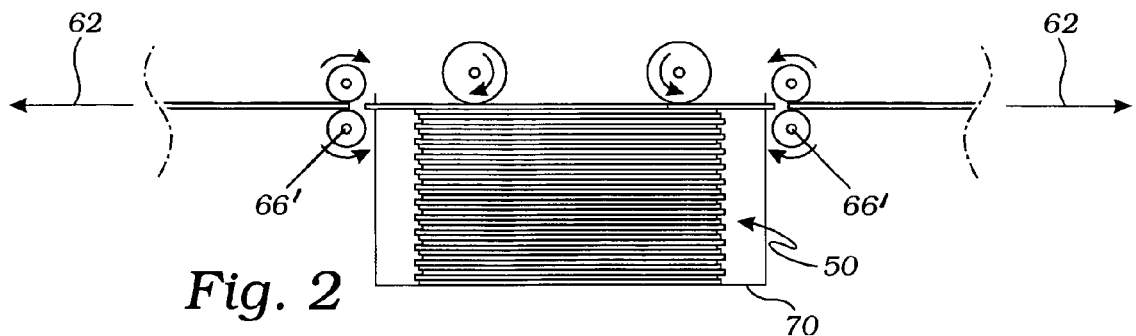
FIG. 2 is schematic diagram of a sheet dispenser thereof showing a dual sheet extraction enablement.

In general, the image source 20 may be a printed document in which case it is optically scanned using any one of the optical scanning means 10. Because of the redundancy, plural sources 20 may be input simultaneously. The image source may also be an electrical signal as from a computer or fax machine, etc. with such coded image carried by electrical wires to any one of the image storing means 30 and with simultaneous receipt of plural signals due to the redundancy. In either case, the image is reduced to an electrical signal and stored within any one of the image storing means 30 in readiness for inputting to any one of the image forming means 40, again redundancy providing considerable flexibility in execution. The ultimate purpose of the present apparatus being to record images onto recording sheets, a plurality of recording sheet dispensing means 70 are made a part of the instant apparatus as shown in FIG. 1. The sheets 50 are stored within the recording sheet dispensing means 70 in a common manner, i.e., in stacks of such sheets 50, one atop the next. Two extraction paths 62 are provided for redundancy, as shown in FIGS. 1 and 2. This is possible by extracting the top sheet 50 from any one of the sheet dispensing means 70, in either of two opposing directions as shown in FIG. 2. The extraction of sheets from storage devices and bins is well known in the art. What is novel is the use of two opposing extraction alternatives with two related and corresponding sheet extraction paths 62 from the sheet dispensing means 70 to the sheet feeding means 60. This redundancy provides significantly improved up-time.

Once the sheets 50 have entered the sheet feeding means 60, the sheets are moved along in a manner well known in the art by pinch rollers, etc. Sheets 50 may enter any one of the parallel transfer paths 64; five are shown, but this number may be reduced or expanded as required by a given system to provide as low a statistical failure rate as desired. It is, very well known in the art as to the technique of moving sheets to one or another of alternative paths of travel so that FIG. 1 suffices to teach the use of multiple sheet travel paths with the dots that are placed in this diagram where lines cross, denoting a point where a traveling sheet 50 may transfer from one path to another, as from a path 62 to a path 64, or from one path 64 to another path 64. Likewise, the sheets 50 may move from the sheet feeding means 60 into and then back again from one or another of the image forming means 40.

Figure 3:
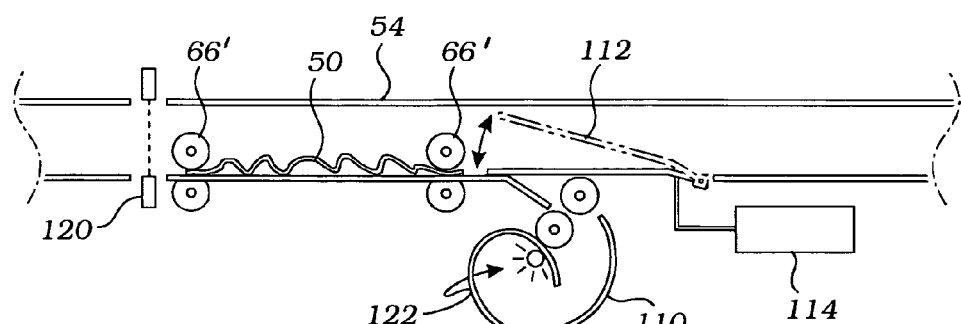
FIG. 3 is a schematic diagram of a typical portion of sheet transport path showing a jam removal system thereof.

The jammed sheet receiving means 110 are containers positioned and enabled for receiving a jammed sheet when the sheet feeding means 60, being adapted for this service, is reversed so that sheets 50 flow in a reverse direction relative to the normal traveling direction so as to move a jammed sheet 50 from the sheet feeding means 60 into the jammed sheet receiving means 110 to clear the path through the sheet feeding means 60. FIG. 3 shows the manner in which this is accomplished. Only the door 112 to the sheet receiving means 110 that is to receive the jammed sheet 50 is opened, so that only the jammed sheet 50 is removed from the sheet feeding means 60, while other sheets 50 in the system are moved backwardly approximately one sheet length distance. When the system starts to move forward again, all sheets 50 continue as before.

The sensors 120, provide information to the controlling means 90 as to when the leading edge of each sheet 50 in the system arrives at each of the sensors 120. When a sheet does not arrive at one of the sensors 120 when expected, the controlling means 90 stops sheet flow and reverses the flow of all sheets 50 until the delayed sheet has been taken out of the system. The assumption here is that the only reason why a sheet would not arrive at a sensor when expected is because it is jammed. If a jam clearance cannot be confirmed by a sensor 122 within the receiving means 110, then an alarm is set so as to summon manual help to clear the jam. The location of the jammed sheet 50 is announced on a readout device.

Figure 4:
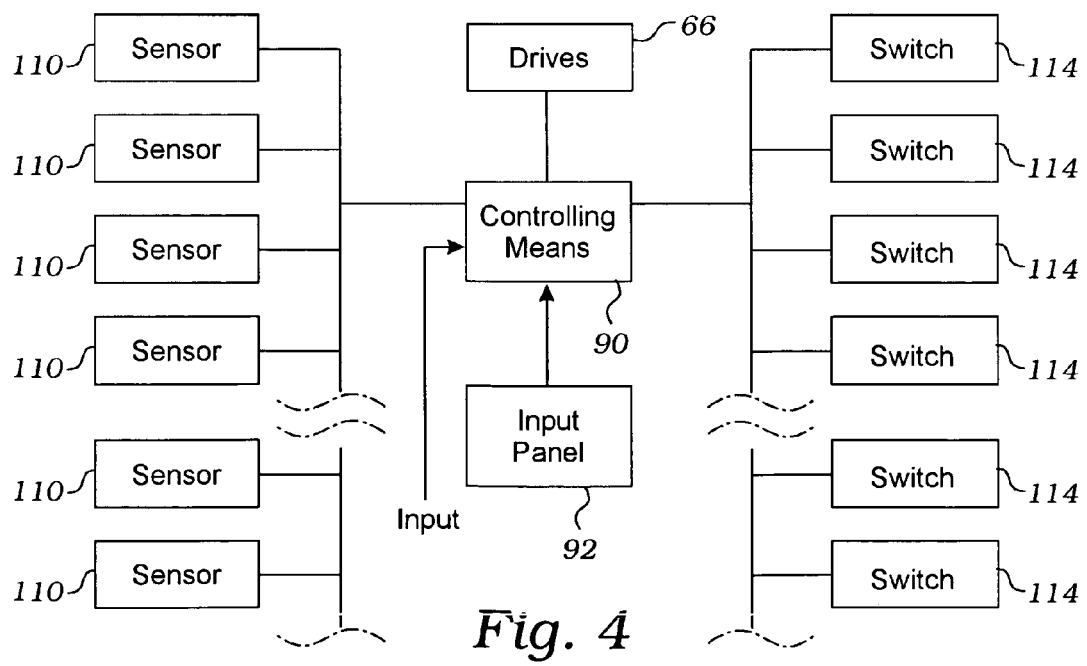
FIG. 4 is a block diagram of a controlling means of the present invention and its interconnection with sensors, drives and switches of the apparatus.

The controlling means 90 may be any industrial type control device and preferably is a device having a computer processor. As shown in FIG. 4, the controlling means 90 received input from an input panel 92 as is well known in the art. Control signals may also be received over electrical lines, as is also well known. Sensors 120 are placed adjacent to the paths 62, 64 and are distributed so as to sense the leading edge of each sheet as it passes the sensor 120. These signals are communicated to the controlling means 90 and each sheet position is compared with an expected sheet position which has been programmed into a memory of the controlling means. Because the controlling means 90 knows when each sheet is extracted from the sheet dispensing means 50, the controlling means is able to predict when each sheet will move past each further sensor 120 along its path. To retract a jammed sheet 50 switches 114, which are preferably electrical solenoid devices capable of moving doors 112 between a normal position, shown in solid line in FIG. 3, and a jam clearance position, shown in phantom line in FIG. 3. Pinch roller sets 66' as a part of drives 66, within receiving means 110 are then able to pull the jammed sheet 50 into the receiving means 110 from where it is later removed manually.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A high reliability imaging system comprising:
   an optical scanning means adapted to produce optical images from an image source;
   an image storing means, connected for receiving and storing the optical images from the optical scanning means;
   a plurality of image forming means, each connected for receiving the optical images from the image storing means and enabled further for forming the images on recording sheets;
   a multi-path sheet feeding means, connected and adapted for: (i) selectively receiving sheets from any one of a plurality of sheet dispensing means, (ii) selectively delivering the sheets to the plurality of image forming means over any of a plurality of paths, so as to enable the forming of latent images onto the sheets, and (iii) thereafter, selectively delivering said sheets with latent images to a sheet receiving means over any of the plurality of paths;
   a controlling means, adapted for selectively choosing paths for the sheets to move from the sheet dispensing means, through a selected one of the image forming means to the sheet receiving means, the controlling means adapted for sensing sheet jams, for activating jam clearance actions, and for selecting alternate sheet paths for optimizing apparatus reliability, and
   a sheet jam sensor means and a jammed sheet receiving means, the sheet feeding means adapted for reversing sheet flow direction so as to move a jammed sheet from the sheet feeding means into the jammed sheet receiving means.

2. The apparatus of claim 1 wherein the sheet jam sensor means comprises a distributed array of a plurality of sensors, the plurality of sensors positioned for sensing each one of the sheets in turn and enabled for transmitting a signal to the controlling means upon sensing of each of the leading edges.

3. A high reliability imaging system comprising: an image forming means enabled for forming images on recording sheets; a sheet feeding means, connected for delivering the recording sheets to a sheet receiving means; a controlling means adapted for sensing jams of the recording sheets in the sheet feeding means, and further adapted for activating jam clearance actions, and further adapted for selecting alternative sheet paths; and a sheet jam sensor means and a jammed sheet receiving means, the sheet feeding means adapted for reversing sheet flow direction of a jammed recording sheet so as to move the jammed sheet from the sheet feeding means into the jammed sheet receiving means for clearing the jam and enabling the sheet feeding means to continue to operate with further recording sheets.

* * * * *